US010525894B1

(12) United States Patent
Williamson

(10) Patent No.: US 10,525,894 B1
(45) Date of Patent: Jan. 7, 2020

(54) BEACH CADDY RACK INSERT

(71) Applicant: Kenneth Williamson, Beloit, OH (US)

(72) Inventor: Kenneth Williamson, Beloit, OH (US)

( * ) Notice: Subject to any disclaimer, the term of this patent is extended or adjusted under 35 U.S.C. 154(b) by 0 days.

(21) Appl. No.: 16/215,796

(22) Filed: Dec. 11, 2018

(51) Int. Cl.
*B62B 5/00* (2006.01)
*B60R 9/00* (2006.01)
*B60R 9/045* (2006.01)
*B60R 9/04* (2006.01)

(52) U.S. Cl.
CPC ............... *B60R 9/045* (2013.01); *B60R 9/04* (2013.01); *B62B 5/00* (2013.01); *B60R 9/00* (2013.01); *B62B 2202/52* (2013.01)

(58) Field of Classification Search
CPC ..... B62B 2202/52; B62B 5/00; B62B 5/0003; B60R 9/00; B60R 9/08
USPC .............. D34/12, 27; 211/182; 224/403, 405
See application file for complete search history.

(56) References Cited

U.S. PATENT DOCUMENTS

| | | | | |
|---|---|---|---|---|
| 3,002,664 A | * | 10/1961 | Guevara | B60R 9/045 224/314 |
| 3,371,797 A | * | 3/1968 | Caligiuri | A47F 7/24 211/204 |
| D252,265 S | * | 7/1979 | Gardner | D34/25 |
| 4,316,615 A | * | 2/1982 | Willette | B62B 1/20 280/47.18 |
| 4,362,309 A | * | 12/1982 | Stamper | B62B 1/18 211/85.19 |
| 4,684,087 A | * | 8/1987 | Spickard | B65B 67/12 224/539 |
| 4,703,944 A | | 11/1987 | Higson | |
| 5,016,893 A | * | 5/1991 | Hart, Jr. | B62B 3/10 211/195 |
| 5,040,808 A | * | 8/1991 | McIntyre | B62B 1/18 248/129 |
| D339,440 S | * | 9/1993 | Dick | D34/12 |
| D341,238 S | * | 11/1993 | Sloan, III | 280/47.19 |
| 5,257,794 A | * | 11/1993 | Nakamura | B62B 3/00 211/182 |
| 5,377,849 A | * | 1/1995 | Martin | A47F 8/02 211/85.7 |
| 5,439,152 A | * | 8/1995 | Campbell | B60R 9/00 108/55.1 |
| 5,465,996 A | * | 11/1995 | Wisz | A45C 13/385 280/35 |
| D365,716 S | * | 1/1996 | Rose, Sr. | D6/552 |

(Continued)

FOREIGN PATENT DOCUMENTS

CA 2154314 12/1996

*Primary Examiner* — Justin M Larson
(74) *Attorney, Agent, or Firm* — Kyle A. Fletcher, Esq.

(57) ABSTRACT

The beach caddy rack insert is an accessory that increases the hauling capacity of a wagon or beach caddy. The beach caddy rack insert may be placed into the wagon and may be retained in place by side walls of the wagon. The beach caddy rack insert may comprise front and rear end sections separated by four detachable longitudinal braces. Cargo may be carried in the wagon by placing the cargo into the wagon between the front end section and the rear end section. Cargo that will not fit into the wagon may be carried by placing the cargo above the wagon on top of the front end section, the rear end section, and/or two of the longitudinal braces. Cargo carried above the wagon may optionally be lashed in place using one or four uprights provided for that purpose.

17 Claims, 5 Drawing Sheets

(56) References Cited

U.S. PATENT DOCUMENTS

| | | | | |
|---|---|---|---|---|
| 5,520,293 A * | 5/1996 | Hartley | ............... | A47B 47/04 |
| | | | | 211/182 |
| D384,464 S * | 9/1997 | Tonzillo | ............... | D34/12 |
| 5,743,412 A * | 4/1998 | Noble | ............... | A47F 1/121 |
| | | | | 211/182 |
| 5,862,921 A * | 1/1999 | Venegas, Jr. | ............... | A47F 10/04 |
| | | | | 211/17 |
| 5,915,722 A | 6/1999 | Thrasher | | |
| 6,027,000 A * | 2/2000 | Sterzel | ............... | B60R 7/02 |
| | | | | 211/182 |
| D421,866 S * | 3/2000 | Long | ............... | D6/552 |
| 6,036,219 A * | 3/2000 | Oefelein | ............... | B62B 3/02 |
| | | | | 280/35 |
| 6,041,987 A * | 3/2000 | Tickoo | ............... | B60R 7/02 |
| | | | | 220/8 |
| 6,131,925 A | 10/2000 | Weldon | | |
| 6,139,219 A * | 10/2000 | Vinarsky | ............... | B63C 3/12 |
| | | | | 248/129 |
| 6,173,839 B1 * | 1/2001 | Dieter | ............... | A45C 3/001 |
| | | | | 190/110 |
| 6,394,326 B1 * | 5/2002 | Lanier | ............... | B60R 9/00 |
| | | | | 224/405 |
| 6,536,640 B1 * | 3/2003 | Gent | ............... | B60R 9/00 |
| | | | | 224/403 |
| 6,598,898 B2 | 7/2003 | Chu | | |
| 6,983,560 B2 | 1/2006 | Williams | | |
| D525,758 S | 7/2006 | Lynch | | |
| 7,083,055 B1 * | 8/2006 | Ambrosat | ............... | A63B 71/0045 |
| | | | | 211/85.7 |
| 7,210,545 B1 | 5/2007 | Wald | | |
| D637,374 S * | 5/2011 | Giannetti | ............... | D34/27 |
| 7,963,530 B1 | 6/2011 | Garcia | | |
| 8,328,029 B1 * | 12/2012 | Binsfeld | ............... | B66F 7/02 |
| | | | | 187/240 |
| 8,430,286 B1 * | 4/2013 | Patrick | ............... | B60R 9/08 |
| | | | | 224/310 |
| D681,900 S * | 5/2013 | Fredendall | ............... | D34/27 |
| D681,901 S * | 5/2013 | Fredendall | ............... | D34/27 |
| 8,465,031 B2 | 6/2013 | Coghill, Jr. | | |
| 8,746,377 B1 * | 6/2014 | Dunbar | ............... | B62B 5/0003 |
| | | | | 180/19.2 |
| 9,415,786 B1 * | 8/2016 | Lorrigan | ............... | B62B 1/206 |
| 9,567,151 B2 * | 2/2017 | Su | ............... | B65D 81/3895 |
| 10,322,662 B2 * | 6/2019 | Lasley | ............... | B63C 13/00 |
| 2009/0302077 A1 * | 12/2009 | Yee | ............... | B60R 9/00 |
| | | | | 224/405 |
| 2010/0155349 A1 * | 6/2010 | Murphy | ............... | B62B 3/02 |
| | | | | 211/86.01 |
| 2011/0215095 A1 * | 9/2011 | Lin | ............... | B65D 25/00 |
| | | | | 220/9.4 |

* cited by examiner

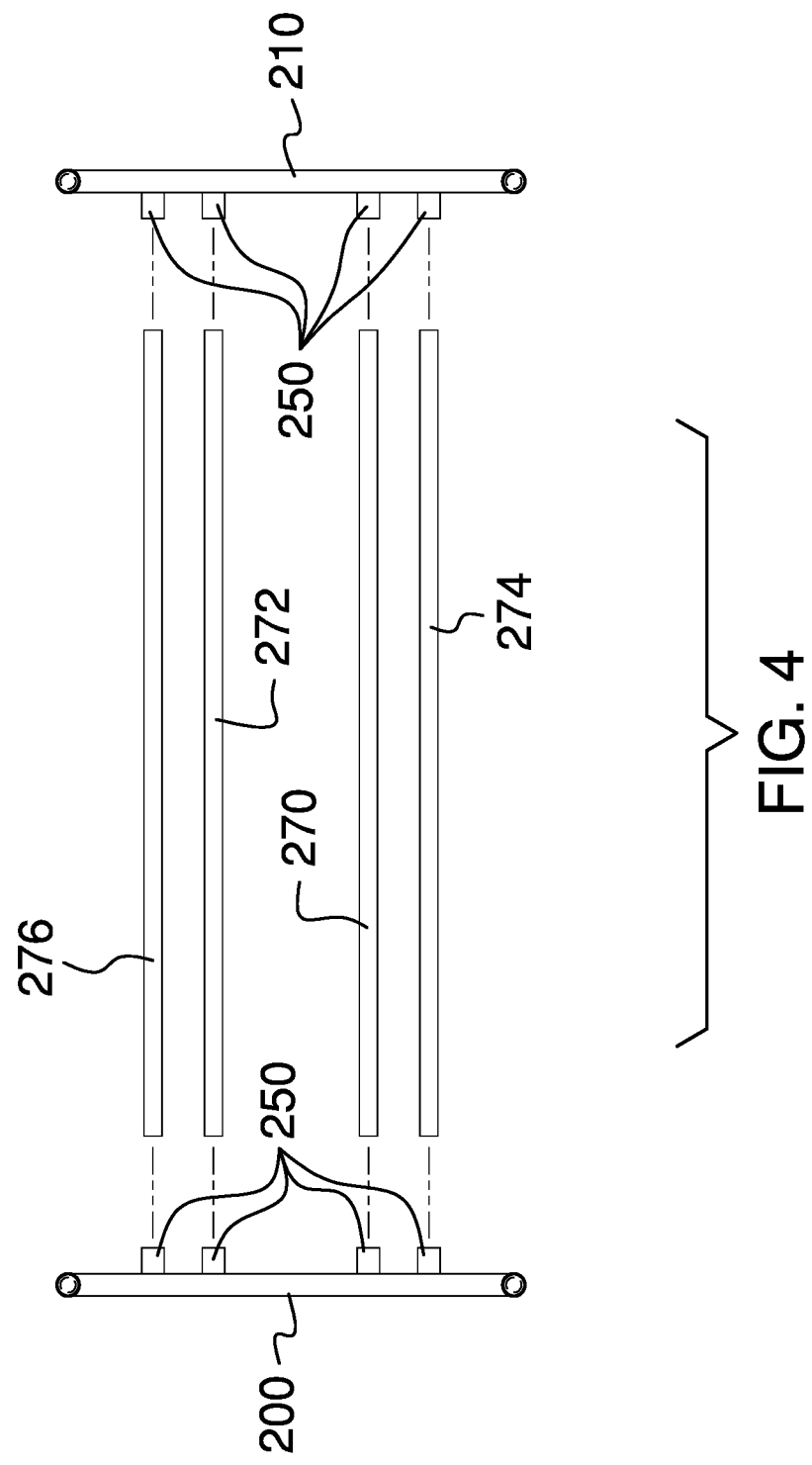

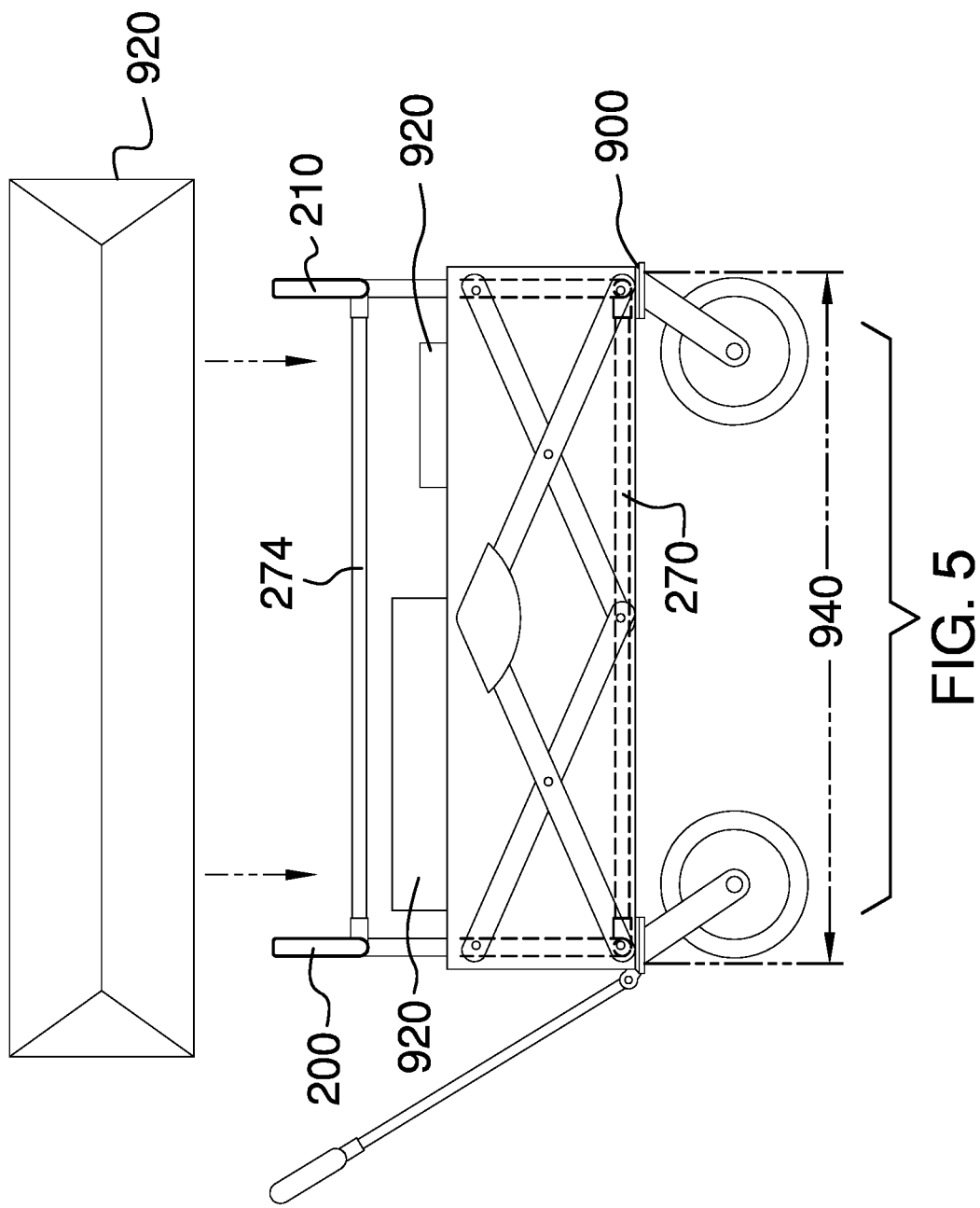

BEACH CADDY RACK INSERT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of recreational cargo hauling, more specifically, a beach caddy rack insert.

SUMMARY OF INVENTION

The beach caddy rack insert is an accessory that increases the hauling capacity of a wagon or beach caddy. The beach caddy rack insert may be placed into the wagon and may be retained in place by side walls of the wagon. The beach caddy rack insert may comprise front and rear end sections separated by four detachable longitudinal braces. Cargo may be carried in the wagon by placing the cargo into the wagon between the front end section and the rear end section. Cargo that will not fit into the wagon may be carried by placing the cargo above the wagon on top of the front end section, the rear end section, and/or two of the longitudinal braces. Cargo carried above the wagon may optionally be lashed in place using one or four uprights provided for that purpose.

An object of the invention is to provide increased cargo hauling space on a wagon.

Another object of the invention is to provide a beach caddy rack insert that separates into a front end section, a rear end section, and four longitudinal braces which may all be stored flat.

A further object of the invention is to allow cargo to be hauled in the wagon between the front end section and the rear end section.

Yet another object of the invention is to allow over-sized cargo to be hauled above the wagon by lashing it to the top of the beach caddy rack insert.

These together with additional objects, features and advantages of the beach caddy rack insert will be readily apparent to those of ordinary skill in the art upon reading the following detailed description of the presently preferred, but nonetheless illustrative, embodiments when taken in conjunction with the accompanying drawings.

In this respect, before explaining the current embodiments of the beach caddy rack insert in detail, it is to be understood that the beach caddy rack insert is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the beach caddy rack insert.

It is therefore important that the claims be regarded as including such equivalent construction insofar as they do not depart from the spirit and scope of the beach caddy rack insert. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is an explode top view of an embodiment of the disclosure.

FIG. 5 is an in-use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
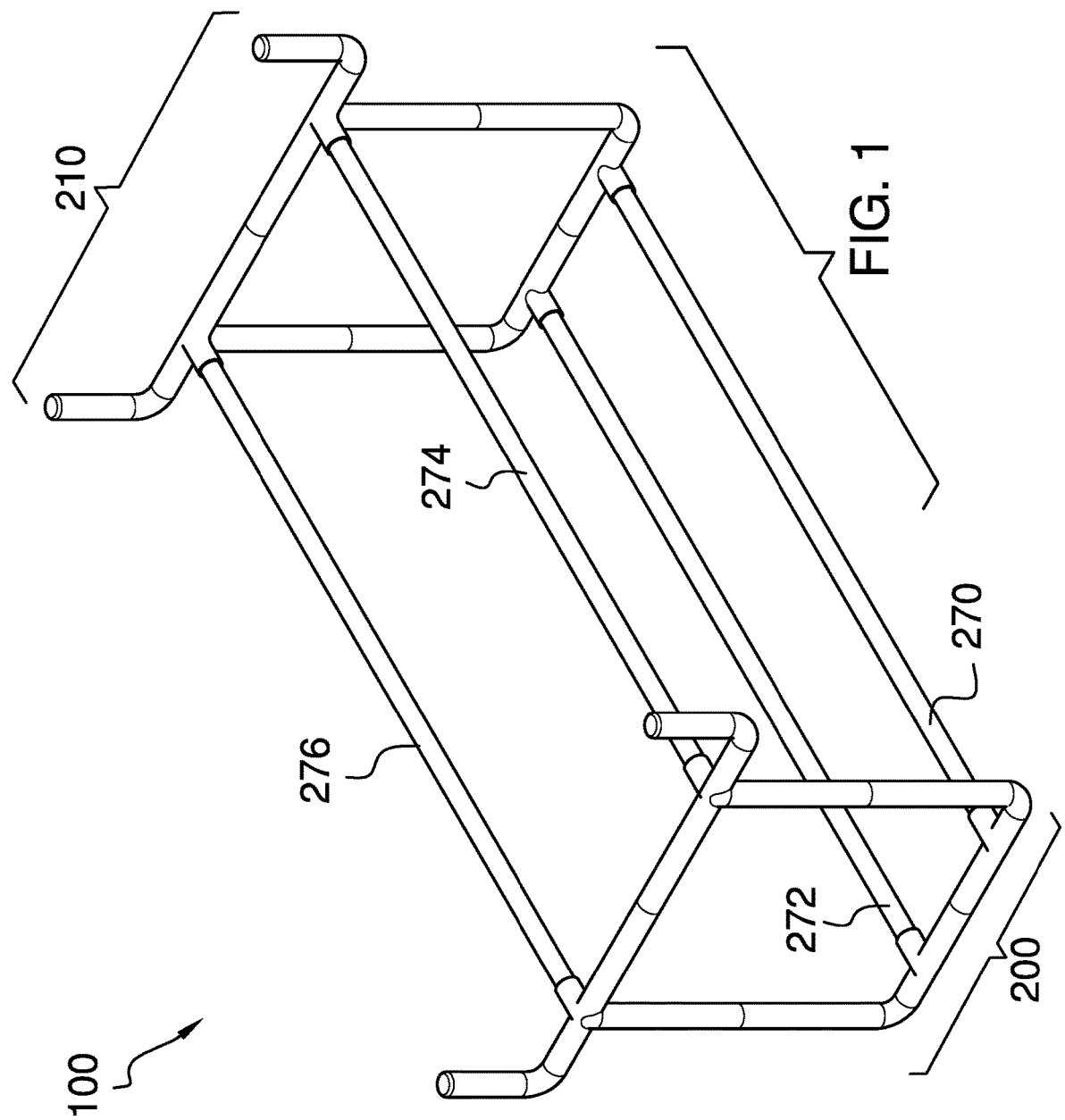
FIG. 1 is a perspective view of an embodiment of the disclosure.
Figure 3:
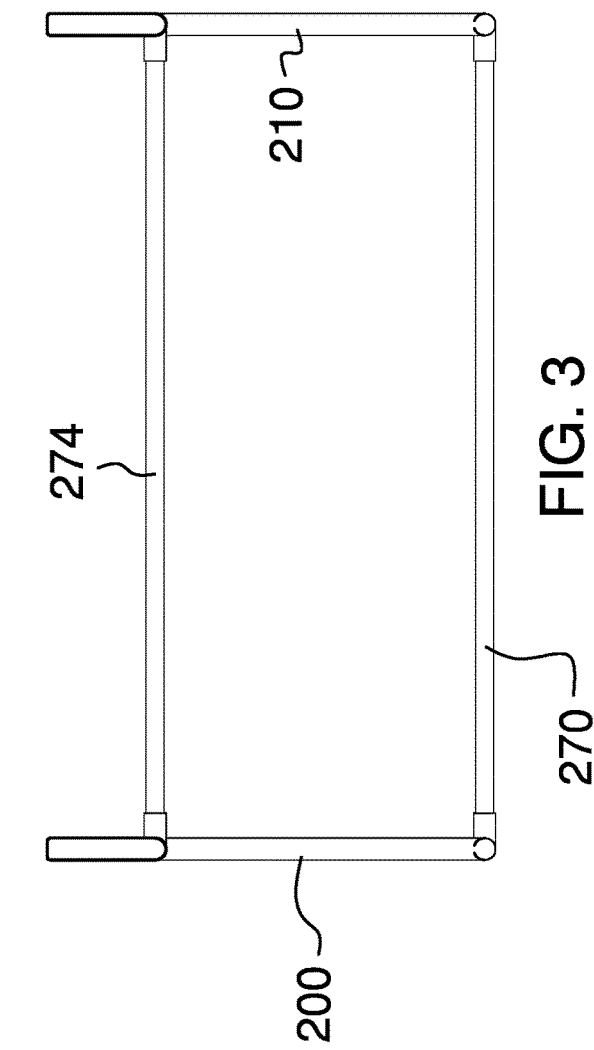
FIG. 3 is a side view of an embodiment of the disclosure.
Figure 2:
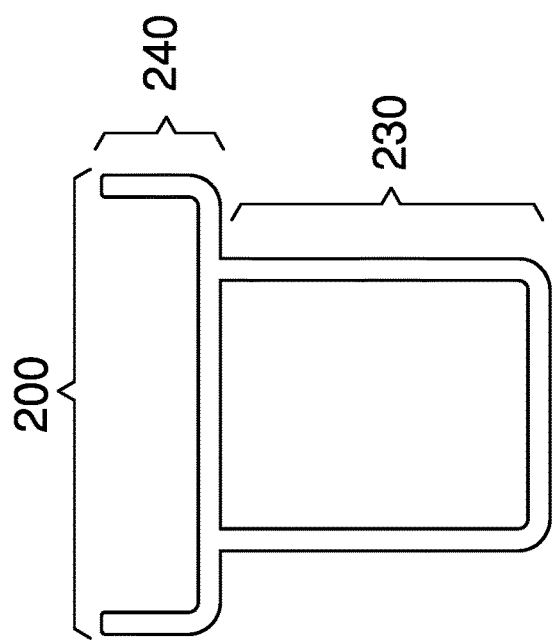
FIG. 2 is a front view of an embodiment of the disclosure.
Figure 6:
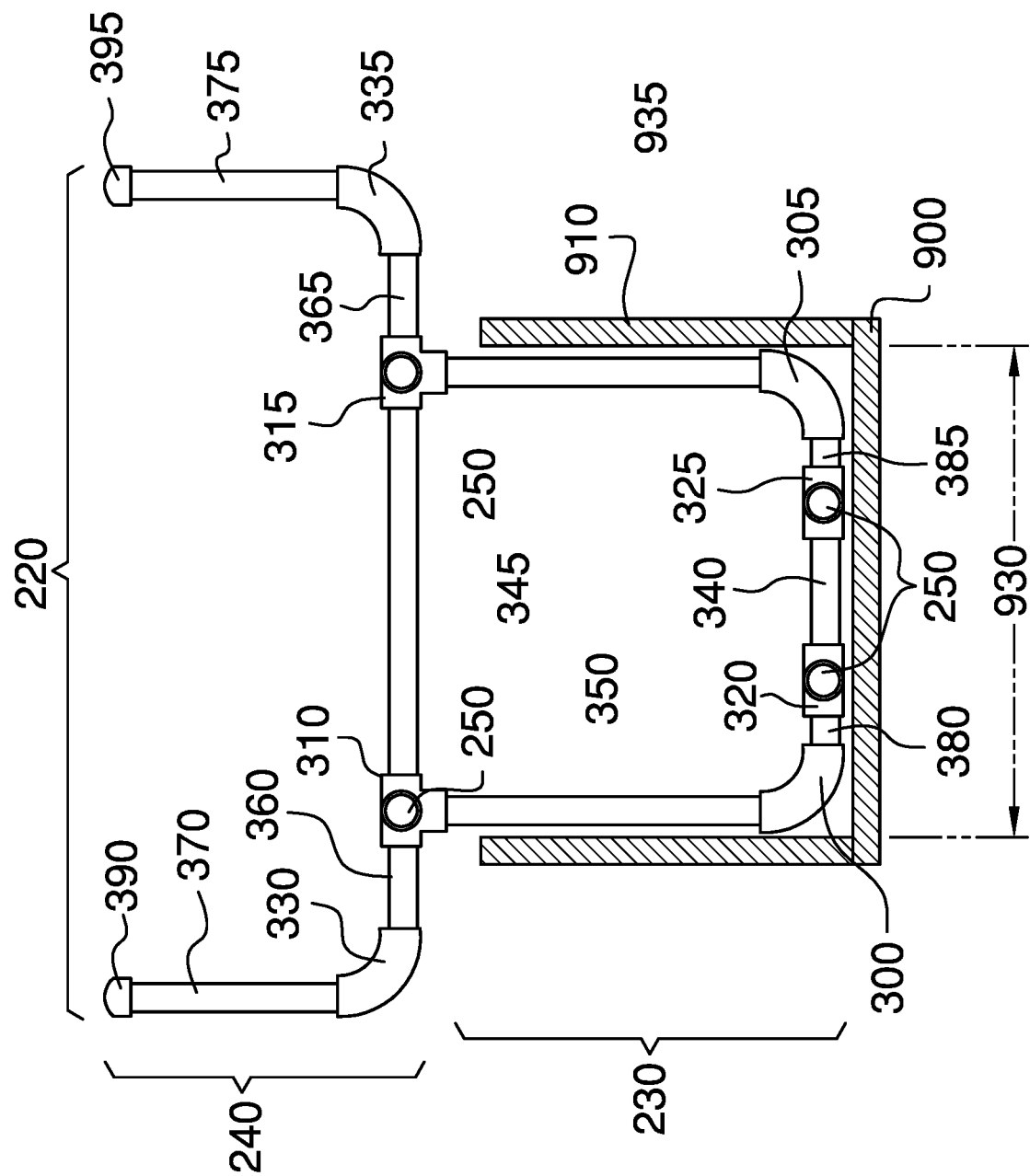
FIG. 6 is a detail view of an embodiment of the disclosure illustrating an individual end section.

Detailed reference will now be made to a first potential embodiment of the disclosure, which is illustrated in FIGS. 1 through 6.

The beach caddy rack insert 100 (hereinafter invention) comprises a front end section 200, a rear end section 210, a first longitudinal brace 270, a second longitudinal brace 272, a third longitudinal brace 274, and a fourth longitudinal brace 276. The invention 100 may be an accessory that increases the hauling capacity of a wagon 900. The wagon 900 may also be known as a beach caddy. The invention 100 may be placed into the wagon 900 and may be retained in place by side walls 910 of the wagon 900.

The front end section 200 may be a vertical framework located at front of the invention 100. The front end section 200 may removably couple to the front end of the first longitudinal brace 270, the front end of the second longitudinal brace 272, the front end of the third longitudinal brace 274, and the front end of the fourth longitudinal brace 276.

The rear end section 210 may be a vertical framework located at rear of the invention 100. The rear end section 210 may removably couple to the rear end of the first longitudinal brace 270, the rear end of the second longitudinal brace 272, the rear end of the third longitudinal brace 274, and the rear end of the fourth longitudinal brace 276.

The front end section 200 and the rear end section 210 may be identical except for being oriented in opposite directions. The front end section 200 may be oriented such that the first longitudinal brace 270, the second longitudinal brace 272, the third longitudinal brace 274, and the fourth longitudinal brace 276 couple to the rear side of the front end section 200. The rear end section 210 may be oriented such that the first longitudinal brace 270, the second longitudinal brace 272, the third longitudinal brace 274, and the fourth longitudinal brace 276 couple to the front side of the rear end section 210.

An individual end section 220 selected from the front end section 200 and the rear end section 210 may comprise a bottom portion 230 and a top portion 240. The bottom portion 230 may be placed within the wagon 900. The bottom portion 230 may be restrained by the side walls 910 of the wagon 900 to prevent the invention 100 from tipping or falling out of the wagon 900. Cargo 920 may be carried in the wagon 900 by placing the cargo 920 into the wagon 900 in an interior space between the bottom portion 230 of the front end section 200 and the bottom portion 230 of the rear end section 210. The top portion 240 may extend above the top of the wagon 900 and may be wider than the wagon 900. The cargo 920 that will not fit into the wagon 900 may be carried by placing the cargo 920 above the wagon 900 on the top portion 240 of the front end section 200, on the top portion 240 of the rear end section 210, on the third longitudinal brace 274, on the fourth longitudinal brace 276, or combinations thereof. The cargo 920 carried above the wagon 900 may optionally be secured by lashing the cargo 920 to a first upright 370 or a second upright 375 of the front end section 200 or to the first upright 370 or the second upright 375 of the rear end section 210. As a non-limiting example, the cargo 920 that may be carried above the wagon 900 may be one or more lawn chairs.

The individual end section 220 may comprise a first joint 300, a second joint 305, a third joint 310, a fourth joint 315, a fifth joint 320, a sixth joint 325, a seventh joint 330, an eighth joint 335, a first lateral spacer 340, a second lateral spacer 345, a first lateral coupler 380, a second lateral coupler 385, a first vertical spacer 350, a second vertical spacer 355, a first lateral extension 360, a second lateral extension 365, the first upright 370, and the second upright 375. The first joint 300, the second joint 305, the seventh joint 330, and the eighth joint 335 may be 90 degree angle joints. The third joint 310 and the fourth joint 315 may be 4-way side outlet tee joints comprising 3 connections that lie in the plan of the individual end section 220 and a fourth connection that is oriented perpendicular to the plane of the individual end section 220 and is directed towards the center of the wagon 900. The fifth joint 320 and the sixth joint 325 may be tee joints that are oriented such that two opposing connections to the tee lie within the plane of the individual end section 220 and the connection located at the middle of the tee is oriented perpendicular to the plane of the individual end section 220 and is directed towards the center of the wagon 900. The first lateral spacer 340, the second lateral spacer 345, the first vertical spacer 350, the second vertical spacer 355, the first lateral extension 360, the second lateral extension 365, the first lateral coupler 380, the second lateral coupler 385, the first upright 370, and the second upright 375, may be straight tubes that lie in the plane of the individual end section 220.

When viewed from the center of the wagon 900, the first joint 300 may comprise the lower left corner of the individual end section 220 and the second joint 305 may comprise the lower right corner of the individual end section 220. (Please refer to FIG. 6.) The right connection of the first joint 300 may couple to the first lateral coupler 380 which in turn may couple to the left connection of the fifth joint 320. The right connection of the fifth joint 320 may couple to the first lateral spacer 340 which in turn may couple to the left connection of the sixth joint 325. The right connection of the sixth joint 325 may couple to the second lateral coupler 385 which in turn may couple to the left connection of the second joint 305.

The bottom of the first vertical spacer 350 may couple to the top connection of the first joint 300 and the bottom of the second vertical spacer 355 may couple to the top connection of the second joint 305. The top of the first vertical spacer 350 may couple to the bottom connection of the third joint 310 and the top of the second vertical spacer 355 may couple to the bottom connection of the fourth joint 315. The left end of the second lateral spacer 345 may couple to the right connection of the third joint 310 and the right end of the second lateral spacer 345 may couple to the left connection of the fourth joint 315.

The left connection of the third joint 310 may couple to the first lateral extension 360 which in turn may couple to the right connection of the seventh joint 330. The bottom end of the first upright 370 may couple to the top connection of the seventh joint 330. The right connection of the fourth joint 315 may couple to the second lateral extension 365 which in turn may couple to the left connection of the eighth joint 335. The bottom end of the second upright 375 may couple to the top connection of the eighth joint 335.

The lengths of the first lateral spacer 340 and the second lateral spacer 345 may be selected such that the first vertical spacer 350 and the second vertical spacer 355 are parallel to each other and are perpendicular to the first lateral spacer 340 and the second lateral spacer 345. The lengths of the first lateral spacer 340 and the second lateral spacer 345 may be selected such that a lateral width measured of the invention 100 from the outside of the first vertical spacer 350 to the outside edge of the second vertical spacer 355 is less than an interior width 930 of the wagon 900.

The heights of the first vertical spacer 350 and the second vertical spacer 355 may be selected such that the first lateral spacer 340 and the second lateral spacer 345 are parallel to each other. The heights of the first vertical spacer 350 and the second vertical spacer 355 may be selected such that a vertical height measured from the bottom of the first lateral spacer 340 to the bottom of the second lateral spacer 345 is at least as high as an interior height 935 of the wagon 900.

The individual end section 220 may be assembled by permanently coupling individual joints and tubes, by permanently coupling subassemblies of joints and tubes, by forming the individual end section 220 in its entirety as one component, or combinations thereof.

In some embodiments, the individual end section 220 may further comprise a first cap 390 and a second cap 395. The first cap 390 may cover the upper end of the first upright 370 to prevent water or other objects from entering the individual end section 220. The second cap 395 may cover the upper end of the second upright 375 to prevent water or other objects from entering the individual end section 220.

The first longitudinal brace 270, the second longitudinal brace 272, the third longitudinal brace 274, and the fourth longitudinal brace 276 may be straight tubes of identical length that separate the front end section 200 and the rear end section 210. The first longitudinal brace 270, the second longitudinal brace 272, the third longitudinal brace 274, and the fourth longitudinal brace 276 may couple to the individual end section 220 by sliding into one of a plurality of perpendicular joint connections 250 on the individual end section 220. The first longitudinal brace 270 may couple the fifth joint 320 of the front end section 200 to the sixth joint 325 of the rear end section 210, the second longitudinal brace 272 may couple the sixth joint 325 of the front end section 200 to the fifth joint 320 of the rear end section 210, the third longitudinal brace 274 may couple the third joint 310 of the front end section 200 to the fourth joint 315 of the rear end section 210, and the fourth longitudinal brace 276 may couple the fourth joint 315 of the front end section 200 to the third joint 310 of the rear end section 210.

The lengths of the first longitudinal brace 270, the second longitudinal brace 272, the third longitudinal brace 274, and the fourth longitudinal brace 276 may be selected such that a longitudinal length of the invention 100 measured from the front edge of the front end section 200 to the rear edge of the rear end section 210 is less than an interior length 940 of the wagon 900.

In use, the invention 100 is prepared for use by sliding one end of the first longitudinal brace 270, the second longitudinal brace 272, the third longitudinal brace 274, and the fourth longitudinal brace 276 into the plurality of perpendicular joint connections 250 on the front end section 200 and then sliding the free ends of the first longitudinal brace 270, the second longitudinal brace 272, the third longitudinal brace 274, and the fourth longitudinal brace 276 into the plurality of perpendicular joint connections 250 on the rear end section 210. The invention 100 is then placed into the wagon 900 by lowering the bottom portion 230 of the front end section 200 and the bottom portion 230 of the rear end section 210 into the wagon 900. The cargo 920 that will fit into the wagon 900 may be placed into the wagon 900 between the front end section 200 and the rear end section 210. The cargo 920 that will not fit into the wagon 900 may be placed on top of the invention 100, resting on the top portion 240 of the front end section 200, the top portion 240 of the rear end section 210, the third longitudinal brace 274, the fourth longitudinal brace 276, or combinations thereof. If necessary, the cargo 920 that is on top of the invention 100 may be lashed to the first upright 370 on the front end section 200, the second upright 375 on the front end section 200, the first upright 370 on the rear end section 210, the second upright 375 on the rear end section 210, or combinations thereof. When not in use, the invention 100 may be disassembled by separating the front end section 200 and the rear end section 210 from the first longitudinal brace 270, the second longitudinal brace 272, the third longitudinal brace 274, and the fourth longitudinal brace 276 and the six components may be stored flat.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "accessory" is a second object that adds to the convenience or attractiveness of a first object. In some instances, an accessory may extend the functionality of the first object by allowing the combination of the accessory plus the first object to perform a task that the first object could not perform alone.

As used in this disclosure, a "brace" is a structural element that is used to support or otherwise steady an object.

As used herein, the words "couple", "couples", "coupled" or "coupling", refer to connecting, either directly or indirectly, and does not necessarily imply a mechanical connection.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, the word "interior" is used as a relational term that implies that an object is located or contained within the boundary of a structure or a space.

As used in this disclosure, the word "lateral" refers to the sides of an object or movement towards a side. Lateral directions are generally perpendicular to longitudinal directions. "Laterally" refers to movement in a lateral direction.

As used herein, the word "longitudinal" or "longitudinally" refers to a lengthwise or longest direction.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A beach caddy rack insert comprising:
a front end section, a rear end section, a first longitudinal brace, a second longitudinal brace, a third longitudinal brace, and a fourth longitudinal brace;
wherein the beach caddy rack insert is an accessory that increases the hauling capacity of a wagon;
wherein the beach caddy rack insert is placed into the wagon and is retained in place by side walls of the wagon; wherein an individual end section selected from the front end section and the rear end section comprises a bottom portion and a top portion; wherein the bottom portion is placed within the wagon; wherein the bottom portion is restrained by the side walls of the wagon to prevent the beach caddy rack insert from tipping or falling out of the wagon; wherein cargo is carried in the wagon by placing the cargo into the wagon in an interior space between the bottom portion of the front end section and the bottom portion of the rear end section; wherein the individual end section comprises a first joint, a second joint, a third joint, a fourth joint, a fifth joint, a sixth joint, a seventh joint, an eighth joint, a first lateral spacer, a second lateral spacer, a first lateral coupler, a second lateral coupler, a first vertical spacer, a second vertical spacer, a first lateral extension, a second lateral extension, a first upright, and a second upright; wherein the first joint, the second joint, the seventh joint, and the eighth joint are 90 degree angle joints.

2. The beach caddy rack insert according to claim 1 wherein the front end section is a vertical framework located at front of the beach caddy rack insert;
wherein the front end section removably couples to the front end of the first longitudinal brace, the front end of the second longitudinal brace, the front end of the third longitudinal brace, and the front end of the fourth longitudinal brace.

3. The beach caddy rack insert according to claim 2 wherein the rear end section is a vertical framework located at rear of the beach caddy rack insert;
wherein the rear end section removably couples to the rear end of the first longitudinal brace, the rear end of the second longitudinal brace, the rear end of the third longitudinal brace, and the rear end of the fourth longitudinal brace.

4. The beach caddy rack insert according to claim 3 wherein the front end section and the rear end section are identical except for being oriented in opposite directions;
wherein the front end section is oriented such that the first longitudinal brace, the second longitudinal brace, the third longitudinal brace, and the fourth longitudinal brace couple to the rear side of the front end section;
wherein the rear end section is oriented such that the first longitudinal brace, the second longitudinal brace, the third longitudinal brace, and the fourth longitudinal brace couple to the front side of the rear end section.

5. The beach caddy rack insert according to claim 1 wherein the top portion extends above the top of the wagon and is wider than the wagon;
wherein the cargo that will not fit into the wagon is carried by placing the cargo above the wagon on the top portion of the front end section, on the top portion of the rear end section, on the third longitudinal brace, on the fourth longitudinal brace, or combinations thereof;
wherein the cargo carried above the wagon is secured by lashing the cargo to a first upright or a second upright of the front end section or to the first upright or the second upright of the rear end section.

6. The beach caddy rack insert according to claim 5 wherein the third joint and the fourth joint are 4-way side outlet tee joints comprising 3 connections that lie in the plane of the individual end section and a fourth connection that is oriented perpendicular to the plane of the individual end section and is directed towards the center of the wagon;
wherein the fifth joint and the sixth joint are tee joints that are oriented such that two opposing connections to the tee lie within the plane of the individual end section and the connection located at the middle of the tee is oriented perpendicular to the plane of the individual end section and is directed towards the center of the wagon.

7. The beach caddy rack insert according to claim 6 wherein the first lateral spacer, the second lateral spacer, the first vertical spacer, the second vertical spacer, the first lateral extension, the second lateral extension, the first lateral coupler, the second lateral coupler, the first upright, and the second upright, are straight tubes that lie in the plane of the individual end section.

8. The beach caddy rack insert according to claim 7 wherein when viewed from the center of the wagon, the first joint comprises the lower left corner of the individual end section and the second joint comprises the lower right corner of the individual end section;
wherein the right connection of the first joint couples to the first lateral coupler which in turn couples to the left connection of the fifth joint;
wherein the right connection of the fifth joint couples to the first lateral spacer which in turn couples to the left connection of the sixth joint;
wherein the right connection of the sixth joint couples to the second lateral coupler which in turn couples to the left connection of the second joint.

9. The beach caddy rack insert according to claim 8 wherein the bottom of the first vertical spacer couples to the top connection of the first joint and the bottom of the second vertical spacer couples to the top connection of the second joint;
wherein the top of the first vertical spacer couples to the bottom connection of the third joint and the top of the second vertical spacer couples to the bottom connection of the fourth joint;
wherein the left end of the second lateral spacer couples to the right connection of the third joint and the right end of the second lateral spacer couples to the left connection of the fourth joint.

10. The beach caddy rack insert according to claim 9 wherein the left connection of the third joint couples to the first lateral extension which in turn couples to the right connection of the seventh joint;
wherein the bottom end of the first upright couples to the top connection of the seventh joint;
wherein the right connection of the fourth joint couples to the second lateral extension which in turn couples to the left connection of the eighth joint;
wherein the bottom end of the second upright couples to the top connection of the eighth joint.

11. The beach caddy rack insert according to claim 10 wherein the lengths of the first lateral spacer and the second lateral spacer are selected such that the first vertical spacer and the second vertical spacer are parallel to each other and are perpendicular to the first lateral spacer and the second lateral spacer;
wherein the lengths of the first lateral spacer and the second lateral spacer are selected such that a lateral width measured of the beach caddy rack insert from the outside of the first vertical spacer to the outside edge of the second vertical spacer is less than an interior width of the wagon.

12. The beach caddy rack insert according to claim 11 wherein the heights of the first vertical spacer and the second vertical spacer are selected such that the first lateral spacer and the second lateral spacer are parallel to each other;
wherein the heights of the first vertical spacer and the second vertical spacer are selected such that a vertical height measured from the bottom of the first lateral spacer to the bottom of the second lateral spacer is at least as high as an interior height of the wagon.

13. The beach caddy rack insert according to claim 12
wherein the individual end section is assembled by permanently coupling individual joints and tubes, by permanently coupling subassemblies of joints and tubes, by forming the individual end section in its entirety as one component, or combinations thereof.

14. The beach caddy rack insert according to claim 12
wherein the individual end section further comprises a first cap and a second cap;
wherein the first cap covers the upper end of the first upright to prevent water or other objects from entering the individual end section;
wherein the second cap covers the upper end of the second upright to prevent water or other objects from entering the individual end section.

15. The beach caddy rack insert according to claim 14
wherein the first longitudinal brace, the second longitudinal brace, the third longitudinal brace, and the fourth longitudinal brace are straight tubes of identical length that separate the front end section and the rear end section;
wherein the first longitudinal brace, the second longitudinal brace, the third longitudinal brace, and the fourth longitudinal brace couple to the individual end section by sliding into one of a plurality of perpendicular joint connections on the individual end section.

16. The beach caddy rack insert according to claim 15
wherein the first longitudinal brace couples the fifth joint of the front end section to the sixth joint of the rear end section;
wherein the second longitudinal brace couples the sixth joint of the front end section to the fifth joint of the rear end section;
wherein the third longitudinal brace couples the third joint of the front end section to the fourth joint of the rear end section;
wherein the fourth longitudinal brace couples the fourth joint of the front end section to the third joint of the rear end section.

17. The beach caddy rack insert according to claim 16
wherein the lengths of the first longitudinal brace, the second longitudinal brace, the third longitudinal brace, and the fourth longitudinal brace are selected such that a longitudinal length of the beach caddy rack insert measured from the front edge of the front end section to the rear edge of the rear end section is less than an interior length of the wagon.

\* \* \* \* \*